July 29, 1969

I. J. McMANUS 3,457,818

STEEL JOIST CONNECTION CUTTER

Original Filed May 2, 1966

INVENTOR.
IRA J. McMANUS

BY James J. Cannon
as attorney

United States Patent Office 3,457,818
Patented July 29, 1969

3,457,818
STEEL JOIST CONNECTION CUTTER
Ira J. McManus, 39 Lincoln Ave.,
Florham Park, N.J. 07932
Original application May 2, 1966, Ser. No. 546,648, now Patent No. 3,392,499, dated July 16, 1968. Divided and this application Oct. 6, 1967, Ser. No. 683,053
Int. Cl. B26d 5/08
U.S. Cl. 83—599                         3 Claims

ABSTRACT OF THE DISCLOSURE

A steel joist connection cutting tool having two cutting bars attached to opposite sides of a handle. Each cutting bar has a slot in its end remote from the handle which serves as the bearing for pin about which the cutters pivot in their cutting stroke.

---

This is a division of my co-pending application Ser. No. 546,648, filed May 2, 1966, now Patent No. 3,392,499.

An object is to provide a tool for cutting sheet metal forms and the like to fit around the vertical shear plates of end connections embodying the invention.

Figure 1:
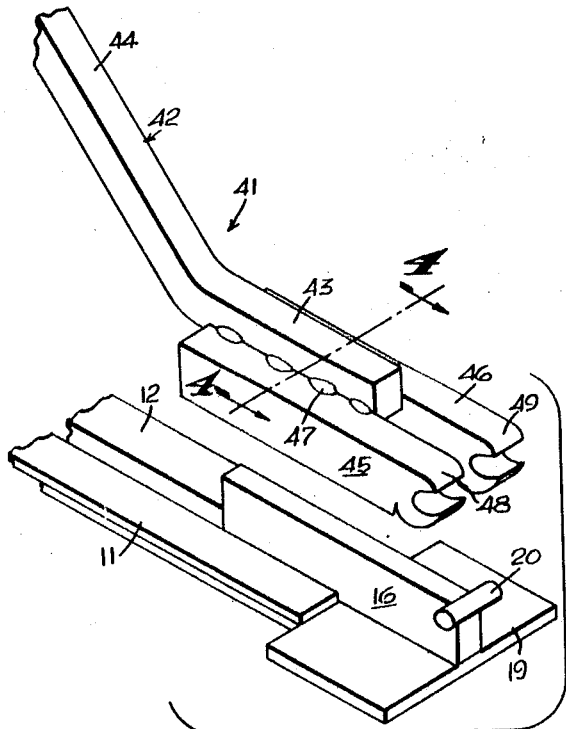
Figure 2:
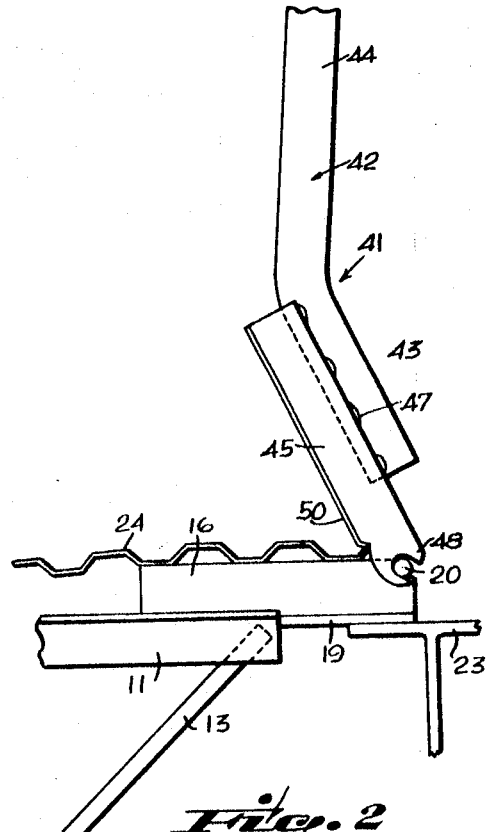
Figure 3:
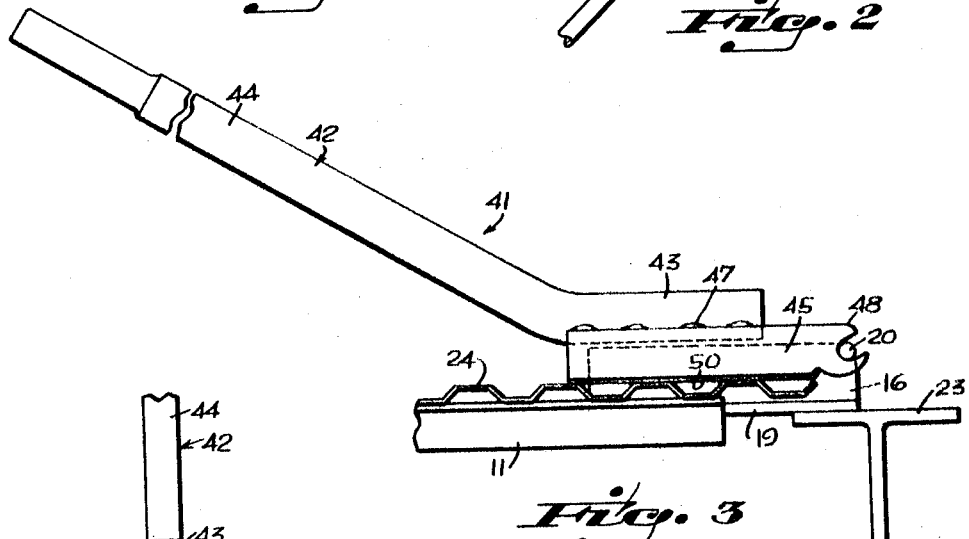
Figure 4:
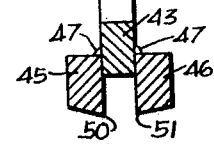

FIG. 1 illustrates, in oblique view as seen from the top, a tool for cutting and pressing sheet metal form material to fit around the vertical shear plates of end connections embodying the invention, and FIGS. 2 and 3 illustrate, in side elevation, the use of the tool in cutting and pressing the form material to fit around a vertical shear plate; and FIG. 4 is a cross-sectional view taken along the line 4—4 of FIG. 1 in the direction of the arrows.

FIGS. 1 through 4 illustrate a tool 41 for cutting a sheet metal form plate 24 to fit around the upwardly-projecting portion of a shear plate 16. The cutting tool 41 is preferably formed of steel bar stock of square cross-section and comprises a central bar 42 having a base portion 43 and an upwardly-extending handle portion 44, and a pair of spaced parallel cutting bars 45, 46 welded along opposite side portions of said base portion as indicated at 47 and having forwardly-projecting portions 48, 49 terminating in a pair of laterally-opposed arcuate recesses adapted to receive end portions of the transversely-extending bar 20 of an end connection as shown in FIG. 2. As best illustrated in FIG. 4, the undersides of the cutting bars 45, 46 are hardened steel cut at an angle along their lengths to provide opposed, inner, acute angle cutting edges 50, 51. The spacing between the cutting bars 45, 46 is slightly greater than the thickness of the shear plate 16 so as to permit straddling thereof when the tool is in use. When the tool 41 is pushed down from the position illustrated in FIG. 2 to the position illustrated in FIG. 3, the tool cutting edges 50, 51 will slit the sheet metal form plate or like material at each side of the shear plate 16 so that it fits around said form plate to extend flat along the length of the end connection to form the bottom of the concrete slab thereat.

While I have illustrated and described herein only four forms in which my invention can conveniently be embodied in practice, it is to be understood that these forms are presented by way of example only and not in a limiting sense.

What I claim as new and desire to secure by Letters Patent is:

1. A tool for cutting sheet material comprising, in combination, a center bar providing a handle at one end, a pair of cutting bars secured in spaced parallel relation along opposed side portions at the other end of said center bar, and projecting outwardly of one side thereof, said cutting bars having opposed parallel, rectilinear cutting edges along said outwardly-projecting side, and hook means at the outer ends of said cutting bars for engaging a pivot member fixed with respect to the sheet material to be cut.

2. A cutting tool as described in claim 1 wherein the outer end of said center bar is bent upwardly in the direction and away from the common plane of said cutting edges.

3. A cutting tool as defined in claim 2 wherein said hook means comprises a pair of transversely-aligned outwardly and upwardly-inclined arcuate recesses formed in the outer ends of said cutting bars.

References Cited

UNITED STATES PATENTS

| 126,264 | 4/1872 | Chase | 83—599 X |
| 287,249 | 10/1883 | Crane | 83—599 |
| 1,112,076 | 9/1914 | McGorvin | 83—607 |
| 1,667,196 | 4/1928 | Darling | 83—599 X |

FRANK T. YOST, Primary Examiner

U.S. Cl. X.R.

83—607